Aug. 11, 1964 R. BASTEN 3,144,550
PROGRAM-CONTROL UNIT COMPRISING AN INDEX REGISTER
Filed Feb. 26, 1959
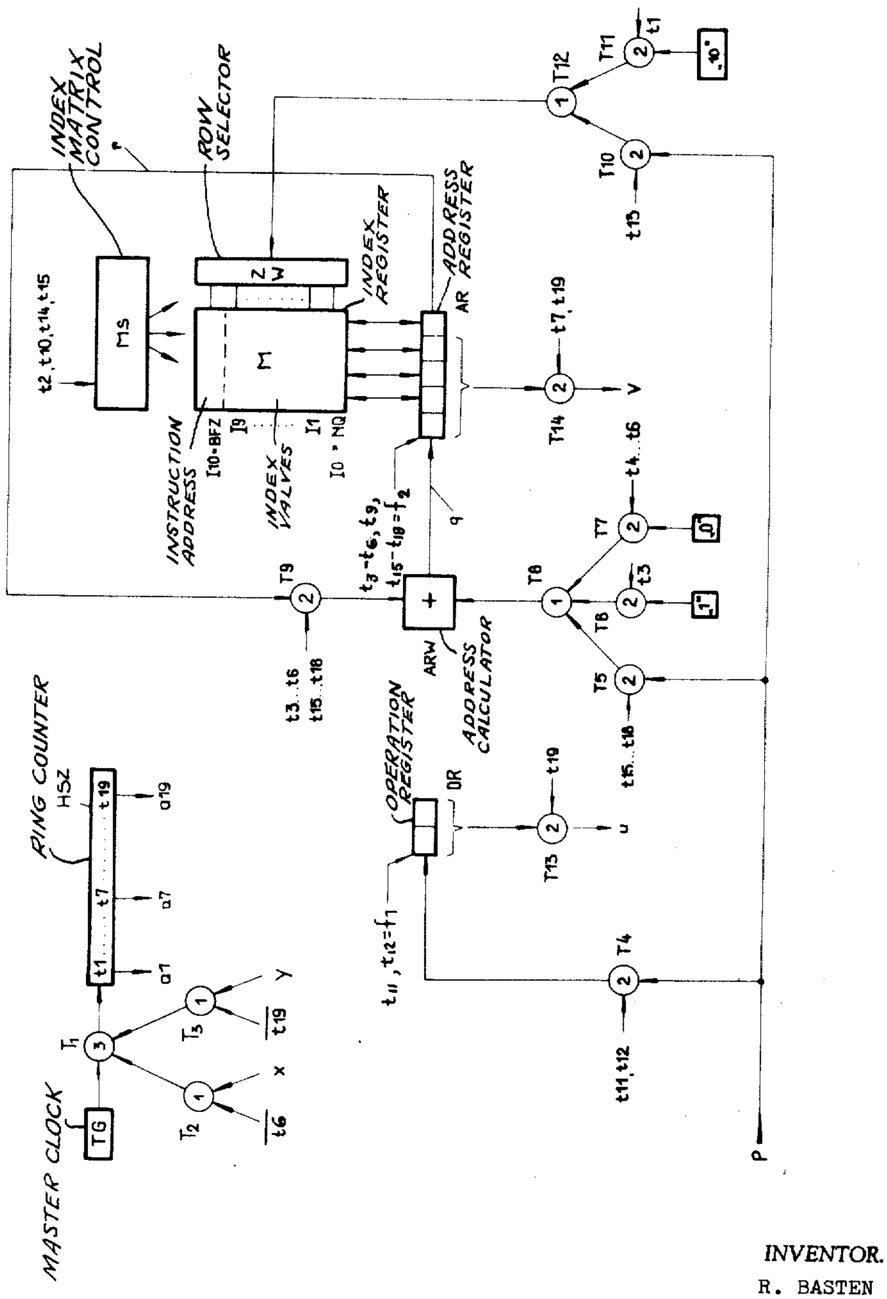
INVENTOR.
R. BASTEN
BY Robert Harding Jr.
ATTORNEY United States Patent Office 3,144,550

Patented Aug. 11, 1964

3,144,550
PROGRAM-CONTROL UNIT COMPRISING AN INDEX REGISTER

Rolf Basten, Stuttgart-Zuffenhausen, Germany, assignor, by mesne assignments, to International Standard Electric Corporation, New York, N.Y., a corporation of Delaware Filed Feb. 26, 1959, Ser. No. 795,737
Claims priority, application Germany Mar. 4, 1958
8 Claims. (Cl. 235—157)

This invention relates to a program-control unit comprising index registers for indexing or registering the steps of a program procedure and an address calculator unit for program-controlled electronic systems, in particular computers, in which the sequence of the program is controlled in accordance with an instruction code which is stored at least in a succession of instruction code words in a storage device. A control unit of this type serves to call up, during each step of the program, one instruction word out of the storage device, and to trigger the operations which are designated by the instruction word. The callup of the instruction words is effected in an order of sequence which is determined by the instruction addresses.

In conventional types of electronic data-processing systems, a counter is provided in the control unit which, by its position, indicates the storage position from which the next instruction is to be called up. When disregarding the jump instructions, the storage positions for the various instruction words are arranged in a close succession behind each other, so that the counter, from program step to program step, is capable of being switched on by the sequence control of the control unit by respectively one position. A counter of this type, which is termed hereinafter a control sequence counter, consists generally of several counting stages. Thus, this counter includes a special decade counter, e.g. for the units, tens and hundreds position, etc. of the instruction address. These types of counters are generally rather expensive with respect to their electrical construction, and the position of the counter, when no special permanent storage means is provided, will be lost when disconnecting the power supply. In other types of program-controlled systems the instruction address is carried along in the instruction itself as a sequence address, so that a control sequence counter will not be necessary at all, but this requires a greater storage capacity for the instruction code.

Furthermore, for controlling the sequence of the steps of the program, an address calculator unit is provided in the control unit of conventional types of data-processing systems, as well as so-called index registers for performing instruction conversions. In the course of such conversion, and upon feeding marking instructions into the control unit, the contents of one or more index registers designated by the marking instructions is added to the operand address or addresses, and the actual performance only of the respective instruction is started subsequently to this instruction conversion.

The invention is directed to the problem of simplifying the construction of such types of control units with address calculator units, and in particular of eliminating the control sequence counter.

According to the invention, this problem is solved for a control unit comprising index registers and an address-calculator unit by providing a particular index-register storage device and an arrangement for adding "1" to the preceding instruction address for each step of the instruction. The index-register storage has, in addition to $n$ rows of register units, and $(n+1)$th row in which the instruction addresses, which may be taken from the instruction word as a sequence address, or which may be determined by counting the instruction words, are stored.

The arrangement for adding "1" to the preceding instruction address comprises a return loop between the $(n+1)$th register row and the address-calculator unit, by means of which the result of the addition is stored in the $(n+1)$th row. Preferably, the index register comprises a magnetic core storage matrix in which the stored information and the instruction address, are maintained even when the power supply source is disconnected.

In order to lend clarity to that which follows, these definitions will be observed.

(1) Instruction word—that received over "P." Includes the Operational Characteristic, the Index, and the Operand Address.

(2) Operational Characteristic—multiply, add, etc.

(3) Index—the line in ZW containing the sought Instruction.

(4) Operand Address—that which is to be added to the Instruction.

(5) Index Value—that which is contained in any row I0–I9.

(6) Instruction—Index Value.

(7) Instruction Address—that which is contained in the $(n+1)$th row I10.

(8) Index Register—storage rows I0–I10 containing the Instructions or Index Values in rows I0–I9 and the Instruction Address in I10.

Further features, advantages and details of the present invention will now be described in the following with reference to the accompanying drawing. In this drawing a control unit is shown which is constructed in accordance with the invention. In this control unit the magnetic-core storage matrix M serves as the index-register storage device. In the matrix M, nine rows of register cores I1 . . . I9 are provided for the storing of instruction data. In addition thereto the matrix M contains another row of register cores I10 (BFZ) for the storage of instruction addresses which, in accordance with the invention, is also utilized for the purpose of control sequence counting.

The access to the individual register rows is controlled by the row selector ZW. In addition thereto, and for the operation of the index-register storage device, a matrix-control device MS is provided, via which the individual writing and reading processes are released in the conventional manner.

For receiving the instruction words over the input circuit P, two program-register sections, an operation register OR and an address register AR, are provided. When an instruction to be carried out is transferred to the control, the operation register OR receives the operational characteristic and the address register AR receives the operand address in converted form. Via writing and reading wires threading the cores, the address register AR is connected with the index-register storage device M, so that it can also receive index values and instruction addresses during individual sequential time periods of one program step. The address register AR, just like the operation register, is designed as a shift register. The stepping inputs *f1* and *f2* of both registers are actuated via a main-control counter HSZ, which is designed as a ring counter and passes through a complete cycle for each step of the program. This counter provides a sequence of pulses some of which control the stepping of OR, some the stepping of AR, some the admission of the operational character into OR, some the admission of the operand address into AR, and others various other functions.

The address register AR contains a plurality of address-storage cells (represented by the squares within the rectangle AR), which is greater by unity than the number of digits in the address. In the discussed example, the address register AR comprises five positions. The number of digits in the address amounts to four. The connections between the address register and the index register are laid out in such a way that intelligence stored in the index-register storage device can be transferred into the last four positions of the address register, in the shifting direction, and vice versa. In other words, the read wires from the columns of the storage matrix M are connected to the inputs of the last four individual cells of the address stored in the storage matrix when the read wires are energized in a well known manner. The same wires or other wires are selectively connected from the outputs of the address cells for transferring the intelligence stored in the cells to a selected row of the storage matrix.

The address-calculator unit for the instruction-conversion purpose, which is denoted by ARW in the drawing, is a simple type of adder in the example described. According to the invention a returning loop *r* is provided which is adapted to connect the output of the address register AR via the gate circuit T9 with the address-calculator unit ARW. By this means an instruction address, which is transferred from the $(n+1)$th line I10 of the index-register storage device to the last four cells of AR, is transmitted from AR over the loop *r*, is increased by one unit by adding a "1" via the gates T6, T7 and T8 in the calculator unit ARW, and is returned via the output line *q* of ARW to the first four cells of AR, and is stored again later on, after having been shifted into the last four poistions of AR, in the $(n+1)$th row (i.e. in the discussed example in row I10) of the index-register storage device. The clock pulses which are required to accomplish this are likewise taken from the main-control counter HSZ, as will be particularly described hereinafter.

Whenever the instruction words from the input circuit P contain a sequence address, then the sequence control of the program control unit will be connected or switched in such a way that the gate T9 will remain blocked and hence that the returning loop will not become effective. Instead, the sequence address which is at first applied to the address register AR, is stored in the register line I10, whereupon the operand address is inserted or fed into the address register AR, and finally also the operational characteristic is fed into the operation register OR.

This operation register OR is connected via gate circuits T13 with output lines *u*, and the address register AR is connected via gate circuits T14 with the output lines *v*. Via both the output lines *u* and *v*, and the marking distributors which are arranged subsequently thereto (not shown in the drawings) the control leads of the individual storages, data-processing units and other sections of the system are marked. If the connecting-through to the marking distributors is no longer required by the operation register OR or by the address register AR, then the output gates T13 or T14 respectively, will be blocked, so that the mentioned registers will become free for the performance of other operations, such as the instruction counting. The performance of the function in the individual units of the system (storage and calculator unit), which is released via the marking distributor, can be controlled by means (not shown) of sections of the sequence control forming part of the control unit, or respectively by a sequence control which is assigned to the individual units, in a manner as known per se. Subsequently to the performance of the functions which are released via the marking distributor, a clearing signal *x* for the connecting-through of instruction addresses is applied to the gate circuit T2, and a clearing signal *y* is applied to the gate circuit T3 for the connecting-through of operand addresses and operational characteristics.

It is pointed out that whenever the positions of an instruction, the positions of a register, or the storage cells of a register row of the index-register storage device, are referred to, it will be understood that these relate not only to one bit, but to one complete code signal, e.g. a binary-coded decimal digit. The same applies to the storage cells which, in this case, are supposed to designate one storage unit for receiving the complete code signal. Thus, for example, by means of only one instruction position the row selector of the index-register storage device can be set to one of the rows 1 . . . 10.

In the following, and with reference to the accompanying drawing, the mode of operation of a control unit designed in accordance with the invention, and comprising an additional row of register elements for instruction-number counters, will be described. It is presupposed that in the discussed embodiment instruction words comprising the instruction code and consisting of seven positions may be fed or applied to the program-control unit via an input line P from a storage device, not shown. The seven positions of an instruction word are divided to provide two positions for the operational characteristic, one position for the index, and four positions for the operand address. Signals representing the individual positions are fed into the control unit in series over the input circuit P, starting with the position of the lowest positional value of the operational characteristic.

Before an instruction word can be inserted into the control unit during a step of the program over the input P, the instruction address has to be taken over by or transferred to the address register AR. This is accomplished in the first cycle of a program step when the main-control counter HSZ, the stepping of which from *t*1 to *t*19 completes a cycle, is set to the normal position *t*1, whereby the output line *a*1 is marked. This marking of the output line *a*1, which is hereinafter briefly referred to as the clock pulse *t*1 causes the opening of the AND-gate T11 so that a permanently recorded instruction "10" is fed via the OR-gate T12 to the row selector ZW, for setting the latter to the register row I10.

A master clock TG, via the coincidence gate T1, steps the main-control counter on by one step, thus delivering a clock pulse *t*2. The coincidnce gate T1 is maintained in its unblocked condition by the gates T2 and T3, as long as one of the stages *t*6 or *t*19 of the main control counter is not energized. The pulses indicated "$\overline{t6}$" and "$\overline{t19}$" in the figure, are the inverse of pulses *t*6 and *t*19; in other words all pulses except *t*6 are delivered to T2 and all pulses except *t*19 are delivered to T3. Therefore, gate T3 is always open except at times *t*6 and *t*19.

Whenever the main-control counter delivers a clock pulse *t*2, which is fed as the control pulse to the matrix-control device MS, the latter causes the contents of the row I10 in the matrix to be transferred to the address register AR. This contents of the line I10 which is transmitted or transferred under control of the clock pulse *t*2 towards AR, designates or represents the instruction address which had been processed during the preceding step of the program. According to the invention this instruction address is fed to the returning loop *r* and by the addition of "1," it is converted into a new instruction address which is to be processed during this step of the program. This is accomplished during the next successive sequence cycles by means of the clock pulses *t*3 . . . *t*6.

The clock pulse *t*3 opens or unblocks the gate circuit T9 and the gate circuit T6, and is applied to the stepping line *f*2 which causes the contents of AR to be shifted by one position. In this case the lowest position of the instruction address is fed via the returning loop *r* and via the unblocked gate circuit T9 to the address-calculator unit ARW. At the same time the permanently recorded value "1" is also transferred via the unblocked gate circuit T6 and the OR-gate T8 to the calculator unit ARW which operates to add "1" to the last digit of the instruction address and transfer it to the first position of AR. In the course of the next pulse of the sequence cycle, which is also applied to *f2*, the next position of the original instruction address is fed under control of the clock pulse *t4* over the line or loop *r* and the gate circuit T9 to the address calculator unit ARW. Since now the gate T6 is blocked by the absence of the clock pulse *t3* while the gate circuit T7 is unblocked by the presence of *t4*, the permanently recorded value "0" is simultaneously fed via the gate circuit T8 to the address-calculator unit ARW, whereupon the result is transferred over line *q* and registered in the register AR as the second position of the new instruction address. In the same way and during the next two pulses of the sequence cycle the values "0" are added to the next digits of the former instruction address, and the corresponding digits of the new instrution address are stored in AR, so that at the end of the sequence cycle after the clock pulse T6 has occurred, the new instruction address is stored in the first four left hand cells of the address register AR.

The outputs of the first four cells of AR are connected via corresponding individual gating circuits T14 with output lines *v*. For reasons of simplicity, only one gating circuit *t14* and one output line *v* are shown in the drawing. The gating circuits T14 are only unblocked by the clock pulses *t7* and *t19*.

However, the application of a clock pulse *t7* is prevented when the feeding-in of clock pulses from the master clock TG via the coincidence gate T1 to the main-control counter HSZ is blocked. A blocking of this kind is effected by the gate T2 which is connected with an inhibiting input line *t6*. Accordingly, when the main-control counter delivers a clock pulse *t7*, in other words, when its output *a6* is energized, and when, consequently, the inhibiting potential appears on the control lead *t7* of T2, then T2 and, consequently, T1 is blocked. The gate T2 can only be unblocked when a signal *x* as a clearing signal for the connecting-through of instruction addresses is applied thereto from a source not shown. A clearing signal of this type indicates whether or not there is a free access to the storage device containing the desired instruction-code word. A blocking of this kind is necessary because it may happen in this storage device that the setting of the operand address, which is fed in during the preceding step of the program, has not been completed, for example, that the operand has not been transferred completely to the main calculator unit, or that the result obtained by the main calculator unit has not been stored completely under the set address. Accordingly, the signal *x* may be designated as a signal for "Storage free for Connecting-through the next Instruction Address."

Subsequently to the application of a signal *x* the main-control counter is stepped on by one step, whereupon a clock pulse *t7* is transferred therefrom and, thereby, unblocks gating circuit T14, and the next instruction is called up by the instruction address stored in AR. It is assumed that the instruction address which is delivered over the output lines *v* is adapted to set a marking distributor (not shown), and that during the next impulse *t8* of the successive sequence cycle, the instruction address is connected through to the access control of the storage device containing the instruction code. It is still to be mentioned that, depending on whether the addresses are connected through in parallel or in series, more than one connecting-through cycle may be required. In such a case several intermediate counting stages for clock pulses *t8a*, *t8b*, etc. would have to be provided in the main-control counter.

Subsequently to the effected connecting-through of the instruction address, the main-control counter will be stepped on, thus producing the clock pulses *t9* and *t10* via the outputs *a9* and *a10*. The clock pulse *t9* is applied to the stepping line *f2* and effects the shifting of the instruction address in AR by one position. The clock pulse *t10* is fed to the matrix-control device MS for effecting the storage of the instruction address in the register line I10 which does not require a new setting of the row selector ZW, because this selector has already been set by the clock pulse *t1* to the row I10. By restoring the instruction address in the register row I10 the instruction-counting process is terminated in accordance with the invention.

Both the construction and the mode of operation of the arrangement described with reference to the accompanying drawing clearly show the advantages of the invention. The only additional expense which is necessary for the instruction-counting purpose is that the index-register storage device has to be provided with the register row I10. The returning loop *r* requires no additional expense, because the address register AR is required in every control unit serving the instruction-storing purpose. The arrangement according to the invention is made in such a way as to provide other advantages. The address register will also be effective at the conversion of operand addresses, in the case of instruction words which are applied in series, under the control of the sequence control. The operational characteristic is first stored in the operation register OR, and at *t3*, which opens gate T10, an index, following upon the operational characteristic, sets the row selector of the index-register storage device, and transfers at *t14* the contents of the designated register row to the address register, and at *t15* to *t18* the returning loop which is provided for the purpose of instruction counting the instruction, feeds the index value to the address-calculator unit together with the application of the operand address which is to be converted and is contained in the instruction word.

The transfer of the instruction word to the control unit immediately follows the back storing of the instruction address, as has already been described. As is shown in the drawing, the gating circuit T1 remains unblocked during the sequence cycle with the clock pulse *t10* for the back-storing purpose, so that the master clock TG will effect the stpeping-on of the main-control counter HSZ. The latter will now deliver further clock pulses *t11* . . . *t19*.

The clock pulses *t11* and *t12* unblock the gate circuit T4, and the two-digit operational characteristic is fed in series from the input P to the operation register OR. The stepping-on of OR is effected by correspondingly applied impulses at *t11* and *t12* via the stepping line *f1*. The clock pulse *t13* unblocks the gating circuit T10, so that thereupon, via the gating circuit T12 which is designed as an OR-circuit, the index following the operational characteristic, will set the row selector ZW.

In case the index has the value $i=0$, then, in view of the subsequently following conversion of the operand address, a source of zeros will be switched on. To this end further additional row I0 (NQ) is provided in the index-register storage device from which the index value zero can be transmitted towards AR.

The clock pulse *t14* is fed to the matrix-control device MS and effects the transmission of the register row, which is selected by the index, to the address register AR. As has already been mentioned, it is presupposed that the index-register storage device is a magnetic-core storage matrix which, subsequently to the reading of one register row, requires this row to be regenerated whenever the storage device is not designed for a non-destructive reading. For this reason, in the discussed example, a further clock pulse *t15* has been provided which is likewise fed to the matrix-control device MS, and effects the restoring of the register contents in the register row which is designated by the index, so that the information in this row of the register will not go astray. In the course of this back storing of the index value the information is maintained in the address register AR which is composed e.g. of flip-flop storage cells.

Together with the back-storing process the conversion of the operand address is started. The clock pulses *t*15 . . . *t*18 unblock the gate circuits T5 and T9 simultaneously with the stepping-on of AR via the stepping line *f*2 at each of these clock pulses. At each step the corresponding denominational value of the operand address is fed from the input circuit P to the address-calculator unit ARW via the gate circuits T5 and T8. At the same time the index value is transmitted from the address register AR via the gate circuit T9 and the loop *r* to the address-calculator unit, while the sum of both the operand address and the index value is again stored in the address register AR via the output line *q*. Simultaneously the reception of the instruction word in the control unit over the input P is terminated, as is also the conversion of the operand address. The converted operand address is now stored in the first four left hand cells of the address register.

Thereupon the main-control counter HSZ is further stepped on to its last position *t*19 of this particular program step, so that the output *a*19 is marked and the gate circuits T13 and T14 are unblocked by a clock pulse *t*19, thereby connecting-through the contents of both the operation and the address registers to the output lines *u* and *v*. Accordingly, via the output lines *u* and *v*. Subsequently arranged marking distributors for the storage callup or reading according to the operand address and for the actuation of the main calculator or arithmetic unit, or of another data-processing unit, are set in accordance with the operational characteristic transmitted over the wires *u*.

Since the clock pulse *t*19 blocks the gating circuit T3, the gate T1 is also blocked, thus preventing the main-control counter HSZ from being stepped on to the normal position *t*1. This blocking is maintained until a signal *y* is applied as a clearing signal for the connecting-through of both the operand address and the operational characteristic. This clearance signal indicates that the control unit can start with the processing of the next successive program step. If the connecting-through of both the operand address an dthe operational characteristic requires several subsequently following sequence cycles, then it is appropriate to provide further counting stages *t*19*a*, *t*19*b*, etc. in the main-control counter, and to give the clearance signal after the evaluation of the instruction word has been terminated. It merely depends on the structure of the system operated by the control unit as to when the clearing signal can be given, and a further explantion on this point is deemed unnecessary herein. When the clearing signal is given, and when, consequently, the transition or changeover to the next step of the program may be permitted then, by means of a corresponding signal *y* via T3, T1 will be unblocked and the main-control counter HSZ will assume its normal position *t*1, by means of which the next successive instruction-counting process can be initiated.

In many cases it is desirable that the instruction address be applied for a longer period of time to the output of the control unit (output lines *v* leading to the marking distributor). In this case the arrangement according to the invention is appropriately modified in such a way that the counting of the instructions can be performed during this period of time. To this end another address register AR may be provided connected in parallel with the address register AR in the drawing, second address register being inserted between AR and the gating circuits T14. This additional address register does not necessarily need to be a shift register. An arrangement according to the invention, so modified, can then be operated in such a way that during the first sequence cycle the contents of the register row I10, which is already the new instruction address, is transferred to AR as well as to the additional address register, and that during the further cycles when the instruction address is in the additional address register, the instruction address for the next successive step of the program is already determined and stored in the register line I10 via the returning loop *r* from AR, T9 and ARW and back to AR.

While I have described above the principles of my invention in connection with specific apparatus, it is to be clearly understood that this description is made only by way of example and not as a limitation to the scope of my invention as set forth in the accompanying claims.

What is claimed is:

1. The combination with an index register, having a plurality of rows of storage elements for storing instructions, of means for utilizing a particular row in said register for an instruction step address storage comprising:
   (*a*) means for producing a plurality of time sequential pulses;
   (*b*) means under control of a particular pulse for selecting the said particular row;
   (*c*) a stepping address register;
   (*d*) means under control of a particular pulse for transferring the information in said particular row into said stepping register;
   (*e*) a calculator unit connected in series between the address register output and input;
   (*f*) means responsive to several particular pulses in said plurality of pulses for causing the contents of said stepping address register to pass therefrom through said calculator unit and back into said stepping register, whereby the said contents are altered in a predetermined manner;
   (*g*) an output coupled to said stepping address register;
   (*h*) means under control of a particular pulse for sending the altered contents of said stepping register over said output;
   (*i*) and means responsive to a particular pulse for restoring the altered contents of said stepping register to said particular row.

2. The combination as claimed in claim 1 further comprising:
   (*a*) means for halting the pulse producing means after a predetermined number of pulses have been produced;
   (*b*) and means for restarting the pulse producing means whereby said plurality of pulses make up one cycle and said cycle is divided into first and second groups of pulses.

3. The combination as claimed in claim 2 further comprising:
   (*a*) an input circuit;
   (*b*) a train of pulses appearing over said input circuit, said train of pulses including two informations the first of which is adapted to select a row in said index register;
   (*c*) means responsive to a particular pulse in said second group of pulses for admitting the said first information whereby the row is selected;
   (*d*) means under control of a particular pulse in said second group for transferring the information contained in the selected row into said stepping register;
   (*e*) means responsive to a plurality of pulses in said second group of pulses for restoring the contents of said stepping register to said selected row, and causing the contents of said stepping register to pass therefrom through said calculator unit and back into said stepping register;
   (*f*) means also responsive to said plurality of pulses for admitting the second information from the said input circuit into said calculator in synchronism with the contents of said stepping register passing therebetween whereby the said second information is converted by said contents;
   (*g*) and means under control of particular pulse in said second group of pulses for sending said converted contents over said output.

4. The combination as claimed in claim 7, in which said calculator merely adds one to the contents of the stepping register passing therethrough.

5. The combination with an index register, having a plurality of rows of storage elements for storing instructions, of means for utilizing a particular row in said register for an instruction step address storage comprising:

(*a*) a ring counter;
(*b*) means coupled to and under control of a particular stage in said counter for selecting the said particular row;
(*c*) a stepping address register;
(*d*) means coupled to and under control of a particular stage in said counter for transferring the information in said particular row into said stepping register;
(*e*) a calculator unit connected in series between the address register output and input;
(*f*) means coupled to and under control of a plurality of stages in said counter for causing the contents of said stepping address register to pass therefrom through said calculator unit and back into said stepping register, whereby the said contents are altered in a predetermined manner;
(*g*) means for causing said counter to step from stage to stage;
(*h*) and means for halting said counter at a predetermined stage.

6. The combination as claimed in claim 5 further comprising:

(*a*) means for resuming the stage to stage stepping of said counter;
(*b*) an output coupled to said stepping address register;
(*c*) means coupled to and under control of a particular stage, subsequent to said predetermined stage, for sending the altered contents of said stepping register over said output;
(*d*) and means coupled to and under control of a particular stage, subsequent to said predetermined stage, for restoring the altered contents of said stepping register to said particular row.

7. The combination as claimed in claim 6 further comprising:

(*a*) an input circuit;
(*b*) a train of pulses appearing over said input circuit, said train of pulses including two informations the first of which is adapted to select a row in said index register;
(*c*) means coupled to and under control of a particular stage, subsequent to said predetermined stage, for admitting the said first information whereby the row is selected;
(*d*) means coupled to and under control of a particular stage, subsequent to said predetermined stage, for transferring the information contained in the selected row into said stepping register;
(*e*) means coupled to and under contrl of a plurality of stages in said counter for restoring the contents of said stepping register to said selected row, and causing the contents of said stepping register to pass therefrom through said calculator unit and back into said stepping register;
(*f*) means also coupled and under control of said plurality of stages for admitting the second information from the input into said calculator in sychronism with the contents of said stepping register passing therethrough whereby the said second information is converted by said contents;
(*g*) and means coupled to and under control of a particular stage, subsequent to said predetermined stage, for sending said converted contents over said output.

8. The combination as claimed in claim 5 in which said calculator merely adds one to the contents of the stepping register passing therethrough.

References Cited in the file of this patent

UNITED STATES PATENTS

| | | |
|---|---|---|
| 2,767,908 | Thomas | Oct. 23, 1956 |
| 2,927,732 | Rinder et al. | Mar. 8, 1960 |